United States Patent [19]

Waddill et al.

[11] 4,219,638

[45] Aug. 26, 1980

[54] POLYETHER DIUREIDE EPOXY ADDITIVES

[75] Inventors: Harold G. Waddill; Heinz Schulze, both of Austin, Tex.

[73] Assignee: Texaco Development Corp., White Plains, N.Y.

[21] Appl. No.: 972,126

[22] Filed: Dec. 21, 1978

Related U.S. Application Data

[62] Division of Ser. No. 890,743, Mar. 27, 1978, Pat. No. 4,146,701.

[51] Int. Cl.$^2$ ............................................. C08G 65/32
[52] U.S. Cl. ............................... 528/421; 260/326.42; 528/408;; 525/403; 525/523
[58] Field of Search ...................... 528/404, 408, 421; 260/326.42

[56] References Cited

U.S. PATENT DOCUMENTS

| | | | |
|---|---|---|---|
| 2,945,863 | 7/1960 | Buc et al. | 260/326.3 |
| 4,115,361 | 9/1978 | Schulze et al. | 528/111 |
| 4,147,857 | 4/1979 | Waddill et al. | 528/94 |

*Primary Examiner*—Earl A. Nielsen
*Attorney, Agent, or Firm*—Carl G. Ries; Thomas H. Whaley; Kenneth R. Priem

[57] ABSTRACT

An epoxy resin having superior resistance to thermal shock comprises a vicinal polyepoxide, a curing amount of a certain bicyclic anhydride and an effective amount of a certain bicyclic anhydride and an additive comprising a polyoxyalkylenepolyamine-maleic anhydride condensation product having (thio)carbamoyl, carbamoyl or thioformyl or formyl end groups.

1 Claim, No Drawings

POLYETHER DIUREIDE EPOXY ADDITIVES

This is a division, of application Ser. No. 890,743, filed Mar. 27, 1978, now U.S. Pat. No. 4,146,701, issued Mar. 27, 1979.

BACKGROUND OF THE INVENTION

1. Field of the Invention

This invention relates to curable epoxy resins having increased thermal shock resistance; and, more particularly, to certain anhydride cured epoxy resins containing a polyoxyalkylenepolyamine-maleic anhydride condensation product.

2. Prior Art

Epoxy resins constitute a broad class of polymeric materials having a wide range of physical characteristics. The resins are characterized by epoxide groups which are cured by reaction with certain catalysts or curing agents to provide cured epoxy resin compositions with certain desirable properties. One such class of curing agents are generally the anhydrides. The most commonly used anhydride curing agents are difunctional materials such as maleic anhydride, phthalic anhydride and the like, as well as tetrafunctional materials such as pyromellitic dianhydride.

Also known to be effective as epoxy curing agents or co-curing agents are various ureas and substituted ureas, such as those disclosed in U.S. Pat. Nos. 3,284,749, 2,713,569, 3,386,956, 3,386,955, 2,855,372 and 3,639,338. The ureas disclosed in the above references are useful as either a sole curing agent or as curing accelerators.

Aliphatic or aromatic compounds having a single terminal ureido group are well known. It has been disclosed in U.S. Pat. No. 2,145,242 to Arnold that diureido terminated aliphatic compounds can be produced by reacting an aliphatic diamine wherein each terminal amine has at least one labile hydrogen with urea. Other substituted ureas are disclosed in U.S. Pat. No. 3,965,072.

Epoxy resins for casting, embedding or encapsulating etc. must withstand repeated cycles of high and low temperatures without cracking. However, lowering the temperature increases stress due to shrinkage and reduces the ability of the resin to flow, thus relieving the stress.

Anhydride cured resins are useful in applications where high heat deflection is required. However, such materials exhibit brittleness and thus a low resistance to thermal shock. Diluents and modifiers do improve thermal shock resistance properties but, unfortunately, adversely influence the heat deflection properties as shown in May and Tanaka, Epoxy Resins, New York, 1973, p. 29). Likewise, plasticizers have not found wide acceptance in epoxy technology primarily because most of them are incompatible with the cured resins.

It has now been unexpectedly found that polyoxyalkylenepolyamine-maleic anhydride condensation product having (thio)carbamyol, carbamyol or thioformyl or formyl end groups, when employed as an epoxy additive, provides cured epoxy resin compositions exhibiting outstanding thermal shock resistance. Specifically, epoxy resins incorporating these additives, upon curing with a specific bicyclic anhydride curing agent, provide a material with high heat deflection and superior resistance to thermal shock.

SUMMARY OF THE INVENTION

According to the broad aspect of the instant invention, the thermal shock resistance of an epoxy resin cured with an alkyl substituted bicyclo vicinal anhydride is enhanced by the addition of an effective amount of an additive comprising a polyoxyalkylenepolyamine-maleic anhydride condensation product having (thio)-carbamyol, carbamyol or thioformyl or formyl end groups.

In one aspect, a curable epoxy resin composition having superior thermal shock resistance comprises a vicinal polyepoxide; a curing amount of bicyclic vicinal anhydride curing agent of a Diels-Alder adduct of a substituted cyclopentadiene and maleic anhydride; and, an effective amount of an additive comprising a polyoxyalkylenepolyamine-maleic anhydride condensation product having (thio)carbamyol, carbamyol or thioformyl or formyl end groups.

In accordance with a preferred embodiment, a diglycidyl ether of 4,4'-isopropylidene bisphenol, a curing amount of a methyl-bicyclo[2,2,1]heptene-2,3-dicarboxylic anhydride curing agent, a dimethylaminomethyl substituted phenol accelerator and an effective amount of an additive made by reacting urea with polyoxyalkylenepolyamine-succinimide.

DETAILED DESCRIPTION OF THE INVENTION

According to the instant inventive concept, blends of a polyepoxide, an anhydride curing agent and a diamide of a polyoxyalkylenepolyamine-urea condensate and, optionally, an accelerator are thoroughly admixed and cured in accordance with conventional methods to provide cured epoxy resins having unexpectedly superior thermal shock resistance while maintaining heat deflection properties.

Generally the vicinal polyepoxide containing composition which are amine cured are organic materials having an average of at least 1.8 reactive, 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolac, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis (4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2′,3,3′-tetrahydroxydipropylsulfide and the like, mercapto alcohols such as monothioglycerol, dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides which can be anhydride cured and are in accordance with the instant invention includes the epoxy novolac resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in Lee, H. and Neville, K., Handbook of Epoxy Resins, McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole. The anhydride curing agents which can be utilized in accordance with the instant invention are generally the alkyl substituted bicyclic vicinal anhydrides, for example, the Diels-Alder adduct of maleic anhydride and a substituted cyclopentadiene. Preferred compounds generally have the formula:

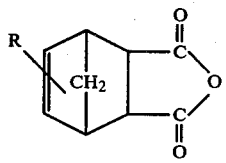

wherein R is a lower alkyl and, more preferably, a lower alkyl of from 1 to 4 carbon atoms. Preferred lower alkyl groups include methyl, ethyl, propyl, and n-butyl. The most preferred alkyl is methyl. The most preferred anhydride is methyl-bicyclo[2,2,1]heptene-2,3-dicarboxylic anhydride.

The succinimide additive may be described as a polyoxyalkylenepolyamine-maleic anhydride condensation product having (thio)carbamoyl or carbamoyl or thioformyl or formyl end groups as represented by the following formula:

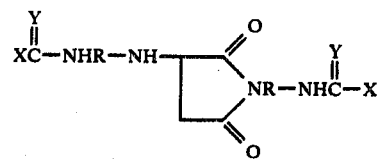

where
Y is S or O
X is $NH_2$ or H and
R is a polyoxyalkylene radical.

A preferred additive as above wherein Y is O and X is NH may be made by reacting urea with polyoxyalkylenepolyamine-succinimide at elevated temperatures until the evolution of ammonia is complete.

Optionally, the epoxy resin formulations of the instant invention can include an "accelerator" to speed the anhydride cure of the epoxy resin, especially at ambient temperatures. In several applications, such acceleration is beneficial, especially when an epoxy resin is used as an adhesive in flammable environment, thus making elevated temperature cure inconvenient or even hazardous. Lee, H. and Neville, K., Handbook of Epoxy Resins, pp. 7–14 describes the use of certain amine-containing compounds as epoxy curing agent-accelerators.

Accelerators are known in the art which can be utilized in accordance with the instant invention; for example tertiary amines such as those disclosed in U.S. Pat. No. 2,839,480. Preferred accelerators in accordance with the instant invention are the dialkyl amine substituted aromatics; and, preferably, the dimethyl amino methyl substituted phenols.

According to the method of the instant invention, the thermal shock resistant properties of certain prior art anhydride cured epoxy resins are enhanced by the addition of an effective amount of an additive comprising a polyoxyalkylenepolyamine-maleic anhydride condensation product having (thio)carbamyol, carbamyol or thioformyl or formyl end groups. The amount of additive effective in bringing about the increased adhesive property is somewhat empirical and will depend upon the resin, and the use of an accelerator. Generally, the succinimide additive can be utilized in amounts from about 2 to about 40 parts by weight based on one hundred parts by weight of the resin constituent; and, preferably, from about 5 to about 30 parts by weight.

The curable epoxy resin compositions of the instant invention generally comprise a vicinal polyepoxide, a curing amount of the alkyl substituted bicyclic vicinal anhydride curing agent and an effective amount of the succinimide additive. Optionally an accelerator can be added.

The anhydride cured resins, having superior thermal shock resistance without substantial deterioration of heat deflection, in accordance with the instant invention, are prepared in a conventional manner. The anhydride curing agent is admixed with the polyepoxide composition in amounts according to the functional carboxyl equivalent weight of the curing agent employed. Generally the number of equivalents of carboxyl groups is from about 0.8 to about 1.2 times the number of epoxide equivalents present in the curable epoxy resin composition, with from 0.9 to a stoichiometric amount being preferred. When using an accelerator, amounts from 1 to about 5 parts by weight based on 100 parts by weight of the resin are generally satisfactory. The exact amount of constituents in accordance with the above general requirements will depend primarily on the application for which the cured resin is intended.

The succinimide additive is incorporated into the uncured resin by admixing. Preferably, the additive is first admixed with the curing agent and/or the accelerator prior to addition to the resin. The constituents forming the curable material are then intimately admixed by standard methods and degassed in the presence of a commercial defoamer and minute amounts of silicone oils to prevent voids and bubbles.

Although all of the epoxy resins disclosed herein are generally useful in accordance with the instant inventive concept, those based on aliphatic compounds are preferably not used exclusively. The presence of resins containing polyglycidyl ethers of polyhydric phenols in amounts greater than 50% by weight of the resin constituent, and more preferably 80% by weight and more preferably 100% by weight has been shown to greatly enhance the desirable properties of the cured material.

In accordance with a preferred embodiment, a curable resin comprises a diglycidyl ether of 4,4'-isopropylidene bisphenol; a curing amount of an anhydride curing agent consisting essentially of methyl bicyclo [2,2,1] heptene 2,3-dicarboxylic anhydride, an accelerator of dimethylaminomethyl substituted phenol; and, an effective amount of an additive made by reacting urea with polyoxyalkylenepolyamine-succinimide. According to a greatly preferred embodiment, from about 80 to about 90 parts by weight of curing agent is used per 100 parts of resin.

A preferred ratio of constituents comprises from about 1 to about 5 parts by weight of accelerator; from 80 to 90 parts by weight anhydride curing agent; and from 5 to 35 parts by weight succinimide additive wherein all of the above amounts are based on 100 parts by weight of the resin. Generally, the mixture of epoxy resin, the succinimide additive anhydride curing agent, and the accelerator is allowed to self-cure at elevated temperatures up to about 200° C.

It will further be realized that various conveniently employed additives can be admixed with the polyepoxide containing composition of the instant invention prior to final cure. For example, in certain instances it may be desired to add minor amounts of other anhydride cocatalysts. Additionally, conventional pigments, dyes, fillers, flame retarding agents and the like which are compatible, natural or synthetic resins can be added. Furthermore, although not preferred, known solvents for polyepoxide materials such as toluene, benzene, xylene, dioxane, ethylene glycol monomethylether and the like can be used. The polyepoxide resins containing the additives of the instant invention can be used in any of the above applications for which polyepoxides are customarily used.

The compositions of the instant invention can be used as impregnants, surface coatings, pottings, capsulating compositions, and laminants.

The following examples illustrate the nature of the instant invention but are not intended to be limitative thereof.

EXAMPLE 1

A succinimide of a polyoxypropylenediamine of about 2000 MW (JEFFAMINE ® D-2000) is prepared as follows: A mixture of JEFFAMINE ® D-2000 (750 g., 0.375 mole) and maleic anhydride (18.4 g., 0.187 mole) was refluxed in benzene until water removal was complete (reaction temperature 145°-195° C.). The resulting product was then vacuum stripped at 180° C./3 MM. The product analyzed as follows—total amine 0.64 meq./g., primary amine 0.43 meq./g.

EXAMPLE 2

A Bis(Urea) of the JEFFAMINE ® D-2000 succinimide is prepared as follows:

A mixture of JEFFAMINE ® D-2000 succinimide (total amine 0.64 meq./g., primary amine 0.43 meq./g., 290 g., 0.0775 moles) and urea (10 g., 0.167 moles) was heated at 130°-135° C. until evolution of ammonia was completed. The product was then vacuum stripped at 120°-130° C./140 MM. The product analyzed as follows—total amine 0.14 meq./g., primary amine 0.12 meq./g.

EXAMPLE 3

This example demonstrates the effect of a Bis(Urea) of JEFFAMINE ® D-2000 succinimide prepared in Example 2 on thermal shock properties of an epoxy resin (diglycidyl ether of 4,4'-isopropylidene bisphenol) cured with a methyl-bicyclo[2,2,1]heptene-2,3-dicarboxylic anhydride ("Nadic Methyl Anhydride" sold by Allied Chemical Corporation, Morristown, N.J. 07960). An accelerator, a dimethylaminomethyl substituted phenol ("DMP-10" sold by Rohm and Haas, Philadelphia, Pa., 19105), was also added to the formulation.

| Formulation: | A | B | C | D |
|---|---|---|---|---|
| Epoxy resin (EEW 190) | 100 | 100 | 100 | 100 |
| NADIC methyl anhydride | 85 | 85 | 85 | 85 |
| DMP-10 (Rohm and Haas) | 2.5 | 2.5 | 2.5 | 2.5 |
| JEFFAMINE ® D-2000 Succinimide Bis(urea) | — | 5 | 10 | 20 |

Thermal shock test samples were prepared by encapsulating a steel washer inside an aluminum evaporating dish with the epoxy resin formulation. Test samples were cured two hours at 100°, one hour at 130° and three hours at 150° C. Ten test samples were prepared from each formulation and these were cycled ten times or until failure occurred.

Thermal cycle: in oven at 140° C. (30 mins.), in bath at −20° C. (15 mins.), at room temperature (15 mins.). Examined for cracking, and, if unchanged, recycled to oven.

No. of samples cracked during cycle no.

| Formulation: | 1 | 2 | 3 | 4 | 5 | 6 | 7 | 8 | 9 | 10 | Total |
|---|---|---|---|---|---|---|---|---|---|---|---|
| A | 6 | 1 | 3 | — | — | — | — | — | — | — | 10 |
| B | 0 | 2 | 0 | 0 | 2 | 0 | 0 | 1 | 0 | 0 | 5 |
| C | 0 | 1 | 4 | 0 | 0 | 0 | 0 | 0 | 0 | 0 | 5 |
| D | 0 | 0 | 0 | 0 | 0 | 0 | 0 | 0 | 0 | 0 | 0 |

EXAMPLE 4

This example demonstrates the effect on thermal shock properties of curing with hexahydrophthalic anhydride and the Bis(Urea) of JEFFAMINE ® D-2000 succinimide of Example 2.

| Formulation | A | B | C |
| --- | --- | --- | --- |
| Epoxy resin (EEW 190) | 100 | 100 | 100 |
| Hexahydrophthalic anhydride | 78 | 78 | 78 |
| Benzyldimethylamine | 1 | 1 | 1 |
| JEFFAMINE® D-2000 Succinimide Bis(urea) | — | 20 | 30 |

No. of samples cracked during cycle no.

| Formulation | 1 | 2 | 3 | 4 | 5 | 6 | 7 | 8 | 9 | 10 | Total |
| --- | --- | --- | --- | --- | --- | --- | --- | --- | --- | --- | --- |
| A | 4 | 1 | 1 | 0 | 1 | 0 | 0 | 0 | 1 | 0 | 8 |
| B | 1 | 0 | 1 | 2 | 1 | 0 | 1 | 0 | 1 | 0 | 7 |
| C | 0 | 0 | 0 | 0 | 0 | 2 | 0 | 0 | 0 | 0 | 2 |

Thermal shock samples cured two hours 100°, one hour 130°, three hours 150° C.

EXAMPLE 5

This example demonstrates the effect on thermal shock properties of curing with phthalic anhydride and the Bis(Urea) of JEFFAMINE® D-2000 succinimide of Example 2.

| Formulation: | A | B |
| --- | --- | --- |
| Epoxy resin (EEW 190) | 100 | 100 |
| Phthalic anhydride | 75 | 75 |
| Benzyldimethylamine | 1 | 1 |
| JEFFAMINE® D-2000 Succinimide Bis(Urea) | — | 30 |

No. of samples cracked during cycle no.

| Formulation | 1 | 2 | 3 | 4 | 5 | 6 | 7 | 8 | 9 | 10 | Total |
| --- | --- | --- | --- | --- | --- | --- | --- | --- | --- | --- | --- |
| A | 6 | 2 | 0 | 0 | 0 | 1 | 0 | 0 | 0 | 0 | 9 |
| B | 0 | 0 | 0 | 0 | 0 | 0 | 1 | 0 | 3 | 0 | 4 |

Thermal shock samples cured one hour, 100°, four hours, 160° C.

We claim:

1. As an additive for increasing the adhesive strength of an anhydride cured epoxy resin, a composition of the formula:

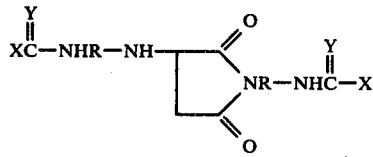

where
Y is S or O
X is NH₂ or H and
R is a polyoxyalkylene radical.

* * * * *